(12) United States Patent
Ari et al.

(10) Patent No.: US 8,857,593 B2
(45) Date of Patent: Oct. 14, 2014

(54) SELECTABLE VALVE ASSEMBLY FOR A VEHICLE TRANSMISSION

(75) Inventors: Vural Ari, Wooster, OH (US); William Brees, Bay Village, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 588 days.

(21) Appl. No.: 13/162,888

(22) Filed: Jun. 17, 2011

(65) Prior Publication Data

US 2011/0315503 A1    Dec. 29, 2011

Related U.S. Application Data

(60) Provisional application No. 61/358,554, filed on Jun. 25, 2010.

(51) Int. Cl.
*F16D 25/0638*    (2006.01)
*F16D 25/12*    (2006.01)
*F16K 31/56*    (2006.01)
*F16K 31/12*    (2006.01)

(52) U.S. Cl.
CPC ............... *F16K 31/566* (2013.01); *F16K 31/12* (2013.01)
USPC ................ 192/85.24; 192/85.29; 192/85.63; 192/114 R

(58) Field of Classification Search
USPC .................... 192/89.29, 92, 101, 85.39, 85.24
See application file for complete search history.

(56) References Cited

U.S. PATENT DOCUMENTS

| | | | | |
|---|---|---|---|---|
| 2,775,330 | A | * | 12/1956 | Schjolin et al. .......... 192/48.612 |
| 3,420,492 | A | | 1/1969 | Ray |
| 4,240,458 | A | | 12/1980 | Huff |
| 6,162,147 | A | | 12/2000 | Moorman |
| 6,239,685 | B1 | | 5/2001 | Albrecht et al. |
| 2010/0304912 | A1 | * | 12/2010 | Sime ................................ 475/5 |

FOREIGN PATENT DOCUMENTS

| | | |
|---|---|---|
| DE | 2539985 A1 | 3/1977 |
| GB | 2114687 A  * | 8/1983 .............. F16D 13/44 |

OTHER PUBLICATIONS

International Search Report for PCT/EP2011/002977, mailed Jan. 14, 2013 by European Patent Office.

* cited by examiner

*Primary Examiner* — Richard M. Lorence
(74) *Attorney, Agent, or Firm* — Kathryn A. Warner; Kevin L. Parks

(57) ABSTRACT

A hydraulic valve assembly for controlling a clutch in a vehicle transmission. The valve assembly includes a housing with a first port for connection to a source of pressurized hydraulic fluid, a displaceable sealing piston disposed within the housing, a valve spring for displacing the sealing piston, a snap-spring having first and second equilibrium positions, and an overstroke spring. In the first equilibrium position a spring force displaces the sealing piston to uncover the first port to enable fluid flow through the valve, and in the second equilibrium position the valve spring displaces the sealing piston to block the first port to block fluid flow through the valve. Moving from the first equilibrium position to the second equilibrium position includes displacing the overstroke spring.

8 Claims, 9 Drawing Sheets

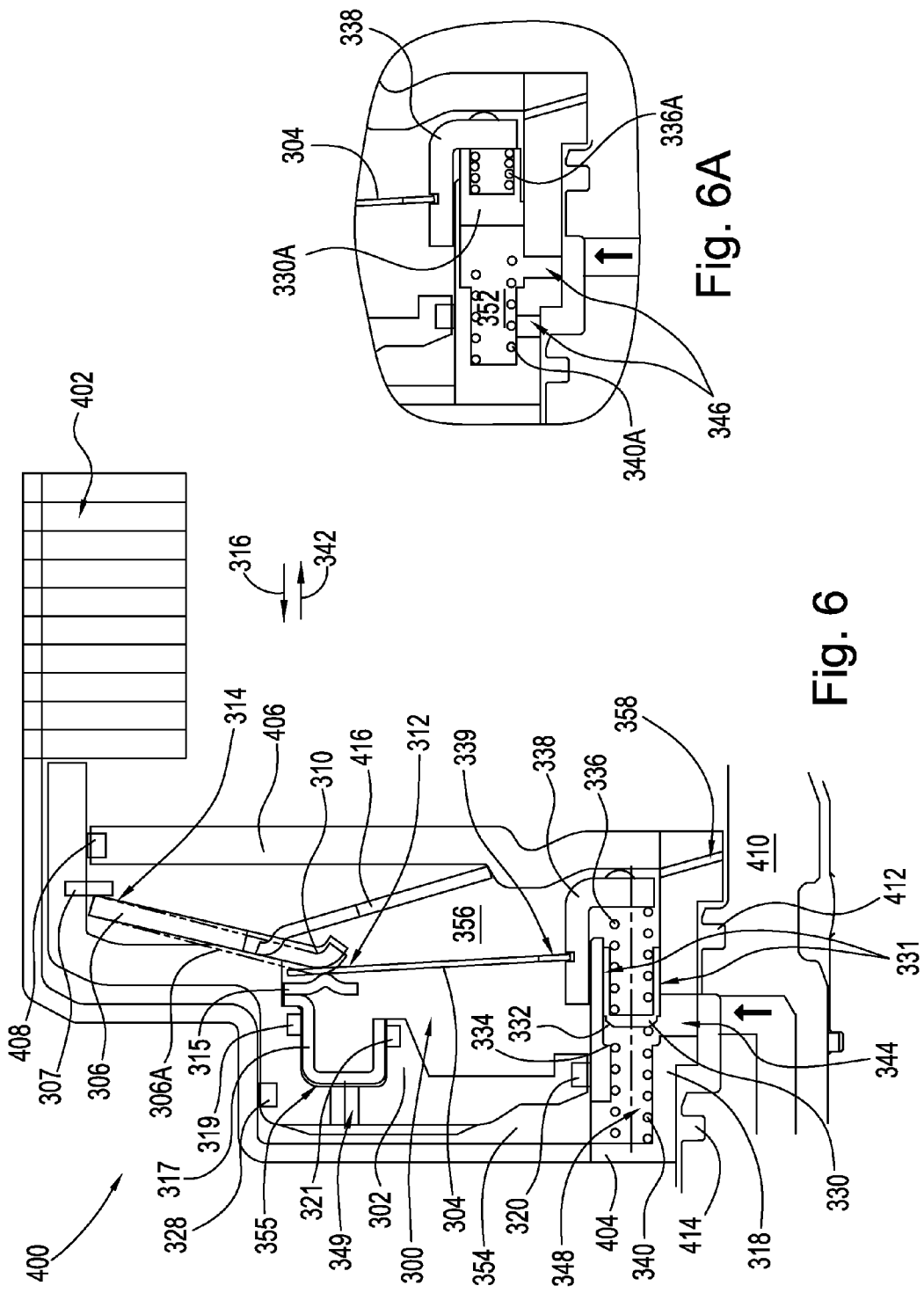

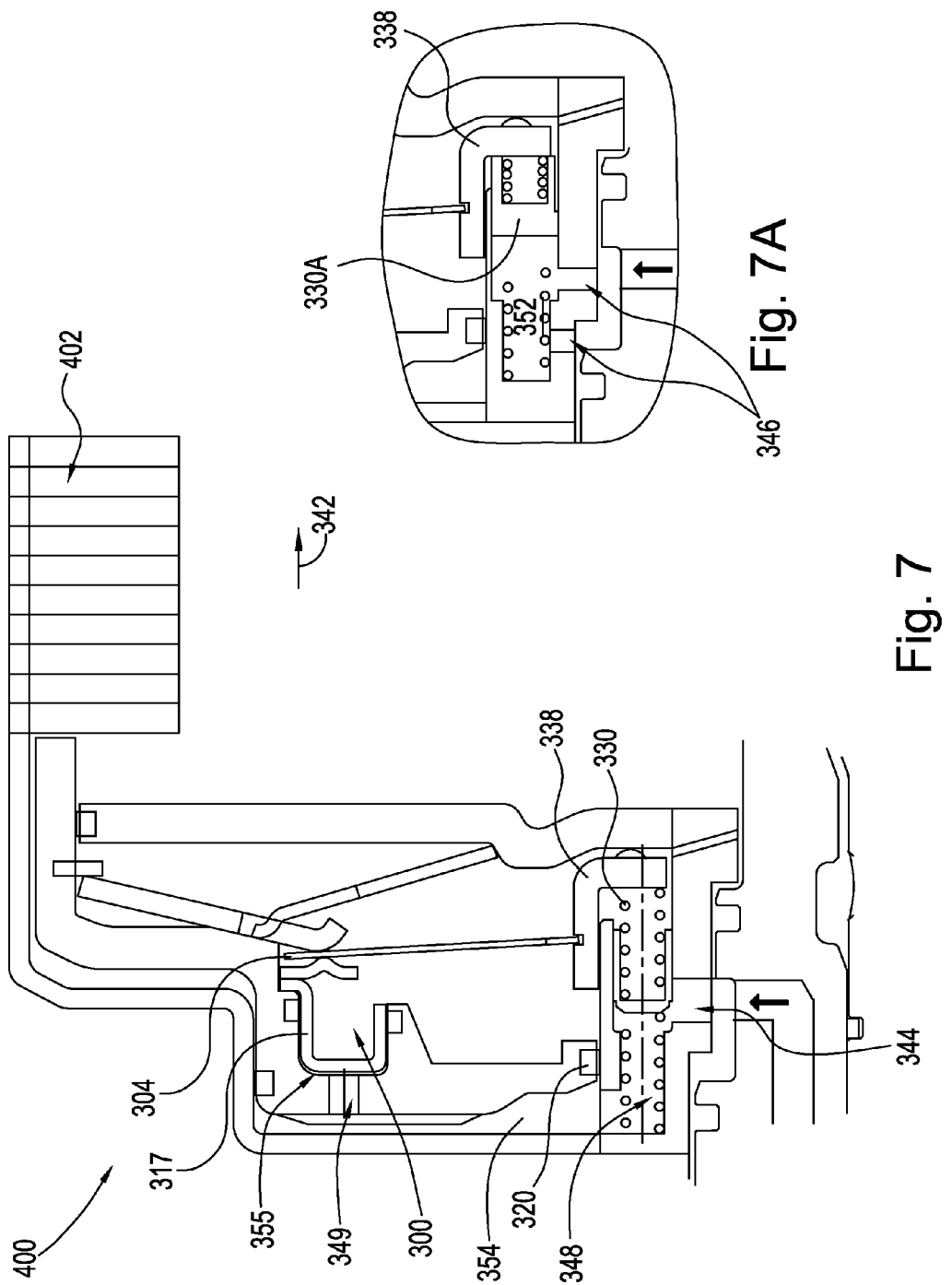

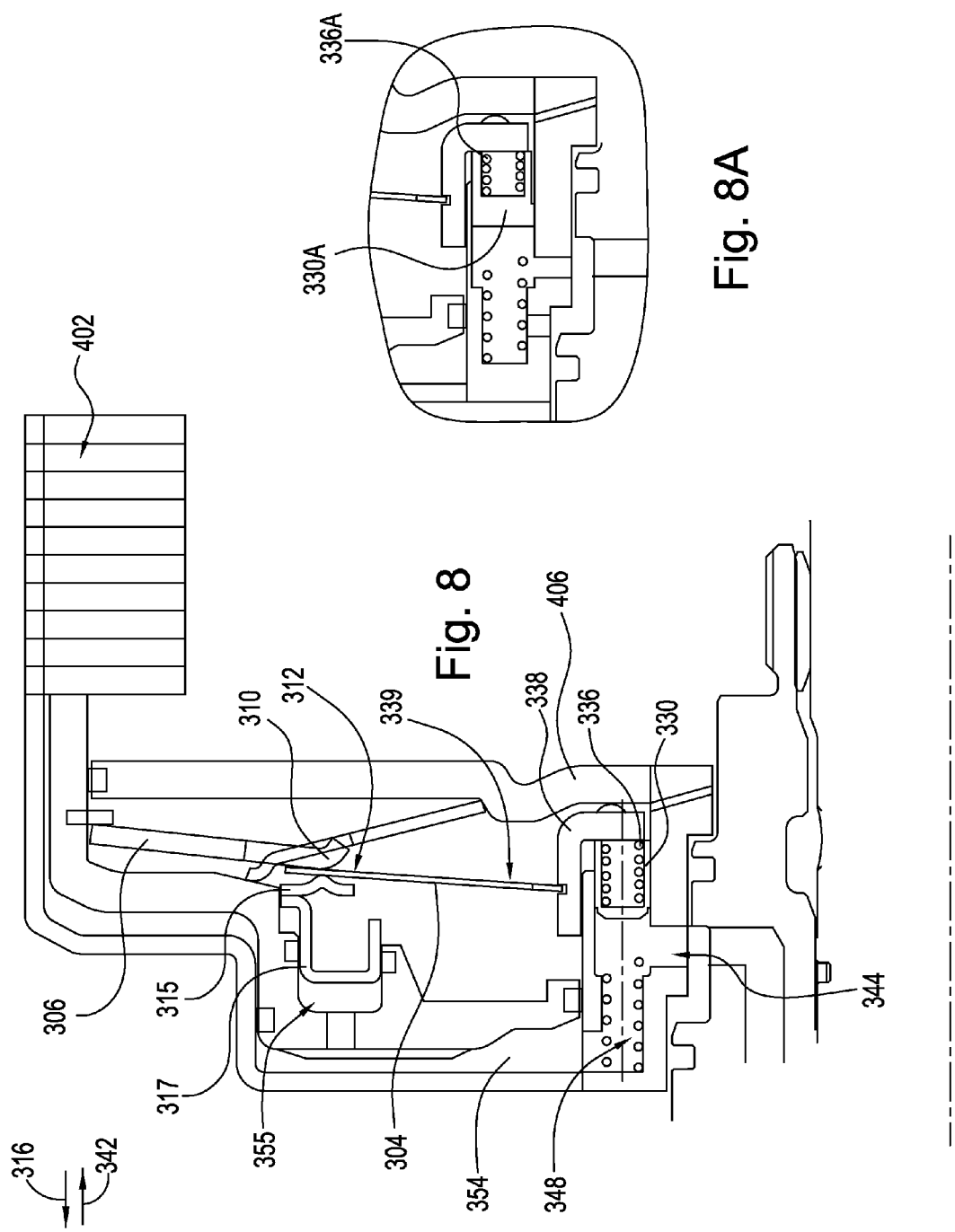

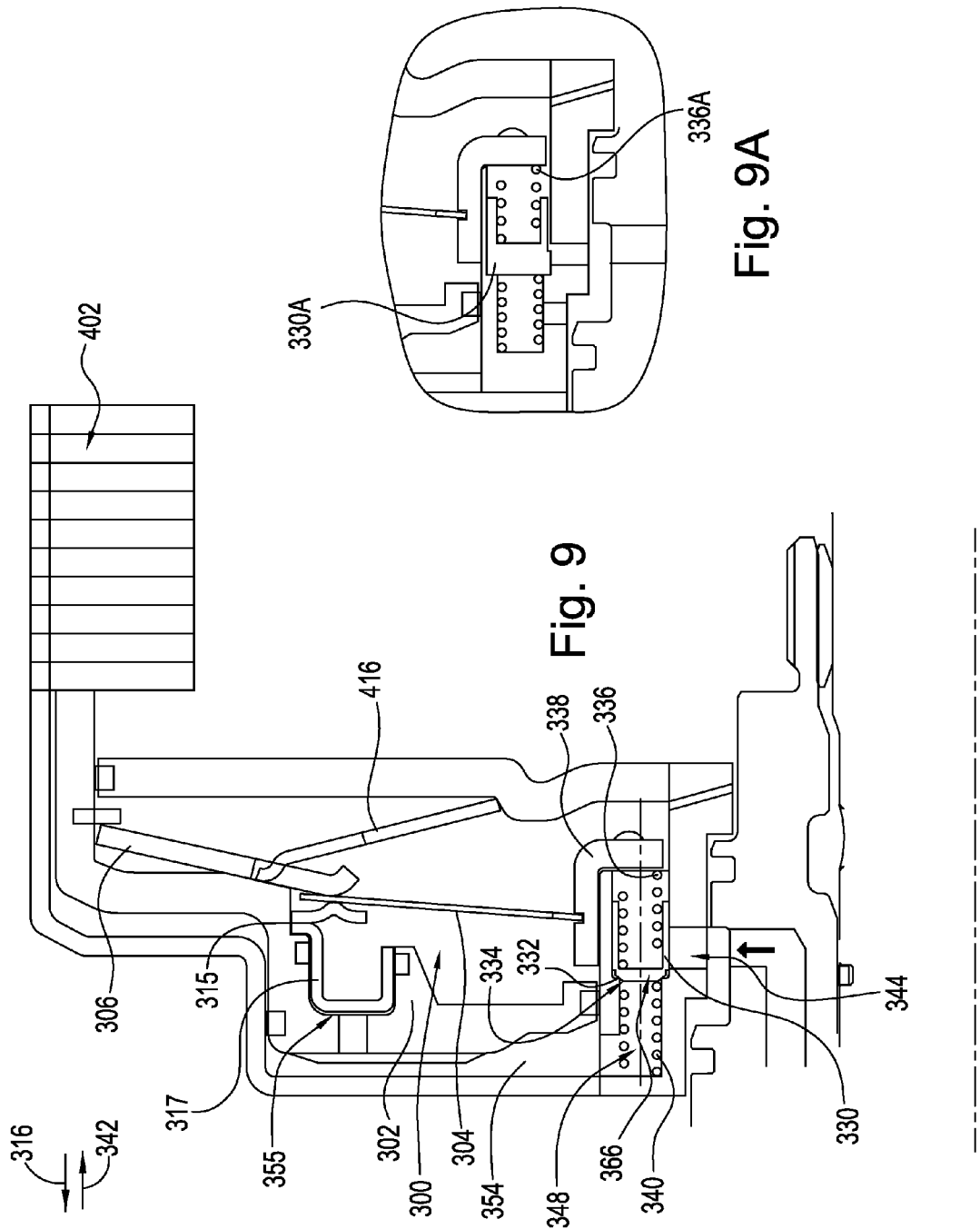

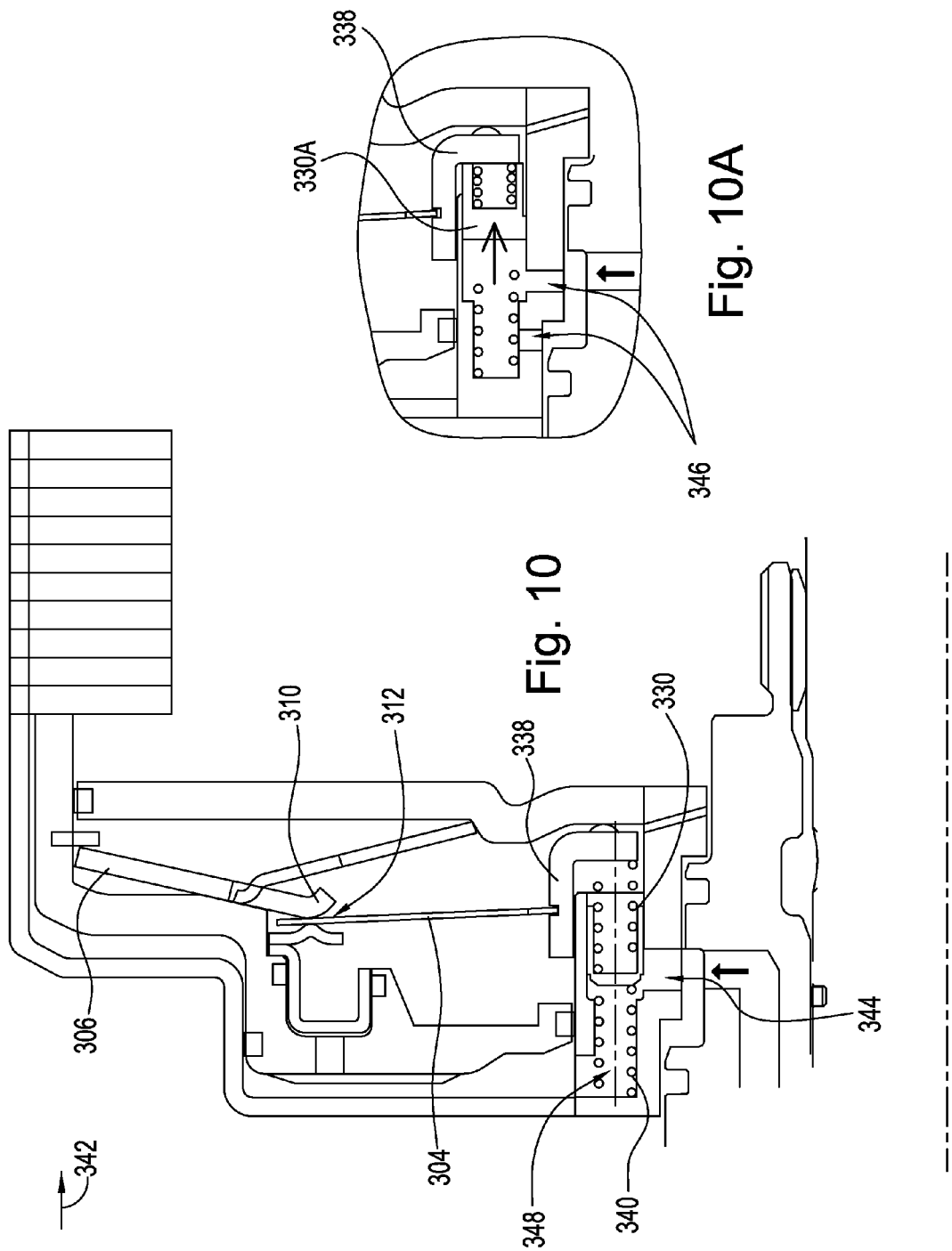

SELECTABLE VALVE ASSEMBLY FOR A VEHICLE TRANSMISSION

FIELD

The invention relates generally to a hydraulic valve, and more specifically to a selectable hydraulic valve assembly for a vehicle transmission operated by hydraulic pressure.

BACKGROUND

Hydraulic valves with snap-springs are known. One example is shown in U.S. Pat. No. 4,240,458 assigned to Harper-Wyman Company. It is also known to use a remote accumulator to decrease shift times in a vehicle transmission. One example of such an accumulator is shown in U.S. Pat. No. 6,162,147 assigned to General Motors Corporation.

BRIEF SUMMARY

Example aspects broadly comprise a hydraulic valve assembly for controlling a clutch in a vehicle transmission. The valve assembly includes a housing with a first port for connection to a source of pressurized hydraulic fluid, a displaceable sealing piston disposed within the housing, a valve spring for displacing the sealing piston, a snap-spring having first and second equilibrium positions, and an overstroke spring. In the first equilibrium position, a spring force displaces the sealing piston to uncover the first port to enable fluid flow through the valve, and in the second equilibrium position, the valve spring displaces the sealing piston to block the first port to block fluid flow through the valve. Moving from the first equilibrium position to the second equilibrium position includes displacing the overstroke spring.

In an example embodiment, the spring force is generated by the snap-spring. In an example embodiment, the valve assembly includes a valve release spring and the spring force is generated by the valve release spring. In an example embodiment, the overstroke spring is a clutch release spring.

In some example embodiments, the snap-spring is displaceable to displace the overstroke spring. The snap-spring is arranged to displace the overstroke spring to move from the first equilibrium position to the second equilibrium position when acted upon by pressurized hydraulic fluid having a pressure greater than a normal operating pressure for the clutch. In an example embodiment, the snap-spring is displaceable to displace the overstroke spring in response to an increase in hydraulic pressure on the snap-spring. In some example embodiments, the valve assembly includes an overstroke piston and the overstroke piston displaces the overstroke spring. The overstroke piston is arranged to displace the overstroke spring to move the snap-spring from the first equilibrium position to the second equilibrium position in response to hydraulic fluid pressure greater than a normal operating pressure for the clutch. In some example embodiments, the valve assembly includes an open piston and moving from the second equilibrium position to the first equilibrium position includes displacing the open piston. The open piston is arranged to move the snap-spring from the second equilibrium position to the first equilibrium position in response to hydraulic pressure less than or equal to a normal operating pressure for the clutch.

Other example aspects broadly comprise a hydraulic valve assembly for controlling a clutch in a vehicle transmission including a housing with a first port for connection to a source of pressurized hydraulic fluid, a displaceable sealing piston disposed within the housing, a valve spring for displacing the sealing piston, a snap-spring having first and second equilibrium positions, and an overstroke spring. In the first equilibrium position the snap spring holds the sealing piston in an open position to enable fluid flow through the valve, and in the second equilibrium position the snap spring is displaced away from the sealing piston and the valve spring holds the sealing piston in a closed position to block fluid flow through the valve. Moving from the first equilibrium position to the second equilibrium position includes displacing the overstroke spring.

Other example aspects broadly comprise a clutch for vehicle transmission including at least one clutch plate, a piston plate displaceable for engaging and disengaging the at least one clutch plate to form a torque path through the at least one clutch plate, a chamber, partially formed by the piston plate for receiving and discharging fluid to displace the piston plate, and a snap-spring displaceable between first and second equilibrium positions. The clutch also includes a hydraulic valve having a housing with a first port for connection to a source of pressurized hydraulic fluid and a second port in fluid communication with the chamber, a displaceable valve piston, and a valve spring. In the first equilibrium position, the snap-spring holds the valve piston in a open position to enable fluid flow from the source of pressurized hydraulic fluid to the chamber via the first and second ports, and in the second equilibrium position, the snap-spring holds the valve piston in a closed position compressing the valve spring.

In some example embodiments, the clutch includes a displaceable sealing piston and, during an engine idle mode, hydraulic pressure is withdrawn from the first port and the valve spring displaces the sealing piston to block the second port and trap hydraulic fluid in the chamber. In some example embodiments, the clutch includes a valve release spring and the valve release spring displaces the sealing piston when the snap-spring is in the first equilibrium position. In an example embodiment, the valve spring generates an apply force, the valve release spring generates a release force, and the apply force is greater than the release force when the valve spring is compressed by the valve piston.

In some example embodiments, the clutch includes an overstroke spring and moving from the first equilibrium position to the second equilibrium position includes displacing the overstroke spring. In an example embodiment, the clutch includes an overstroke piston, the pressurized hydraulic fluid displaces the overstroke piston, and the overstroke piston displaces the overstroke spring. A pressure of the pressurized fluid is greater than a normal operating pressure for the clutch when the overstroke spring is displaced.

In an example embodiment, the clutch includes a chamber for receiving and discharging fluid to displace the piston plate and the overstroke piston displaces the overstroke spring in response to hydraulic pressure in the chamber greater than a normal operating pressure for the chamber. In some example embodiments, the clutch includes an open piston and moving from the second equilibrium position to the first equilibrium position includes displacing the open piston. In an example embodiment, the pressurized hydraulic fluid displaces the open piston, and a pressure of the pressurized hydraulic fluid is less than or equal to a normal operating pressure for the clutch when the open piston is displaced.

Other example embodiments broadly comprise a hydraulic valve assembly for a vehicle transmission including a housing, a sealing piston disposed within the housing and displaceable to open and close the valve, a snap-spring having first and second equilibrium positions, a valve spring, and a displaceable overstroke spring. In the first equilibrium position the snap-spring displaces the sealing piston to hold the valve in an open position, and in the second equilibrium position the valve spring displaces the sealing piston to hold the valve in a closed position. Transitioning from the first equilibrium position to the second equilibrium position includes displacing the overstroke spring.

BRIEF DESCRIPTION OF THE DRAWINGS

The nature and mode of operation of the present invention will now be more fully described in the following detailed description of the invention taken with the accompanying drawing figures, in which:

FIG. 6 is a cross sectional view of a hydraulic valve shown in an open mode according to an example aspect;

FIG. 7 is a cross-sectional view of the valve of FIG. 6 shown in a clutch apply mode;

FIG. 7A is a detail view of a portion of the valve of FIG. 6 circumferentially offset from the portion of the valve depicted in FIG. 7, shown in a clutch apply mode;

FIG. 8 is a cross-sectional view of the valve of FIG. 6 shown in a transition mode;

FIG. 8A is a detail view of a portion of the valve of FIG. 6 circumferentially offset from the portion of the valve depicted in FIG. 8, shown in a transition mode;

FIG. 9 is a cross-sectional view of the valve of FIG. 6 shown in an idle-stop mode;

FIG. 9A is a detail view of a portion of the valve of FIG. 6 circumferentially offset from the portion of the valve depicted in FIG. 9, shown in an idle-stop mode;

FIG. 10 is a cross-sectional view of the valve of FIG. 6 shown in a re-open mode;

FIG. 10A is a detail view of a portion of the valve of FIG. 6 circumferentially offset from the portion of the valve depicted in FIG. 10, shown in a re-open mode.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
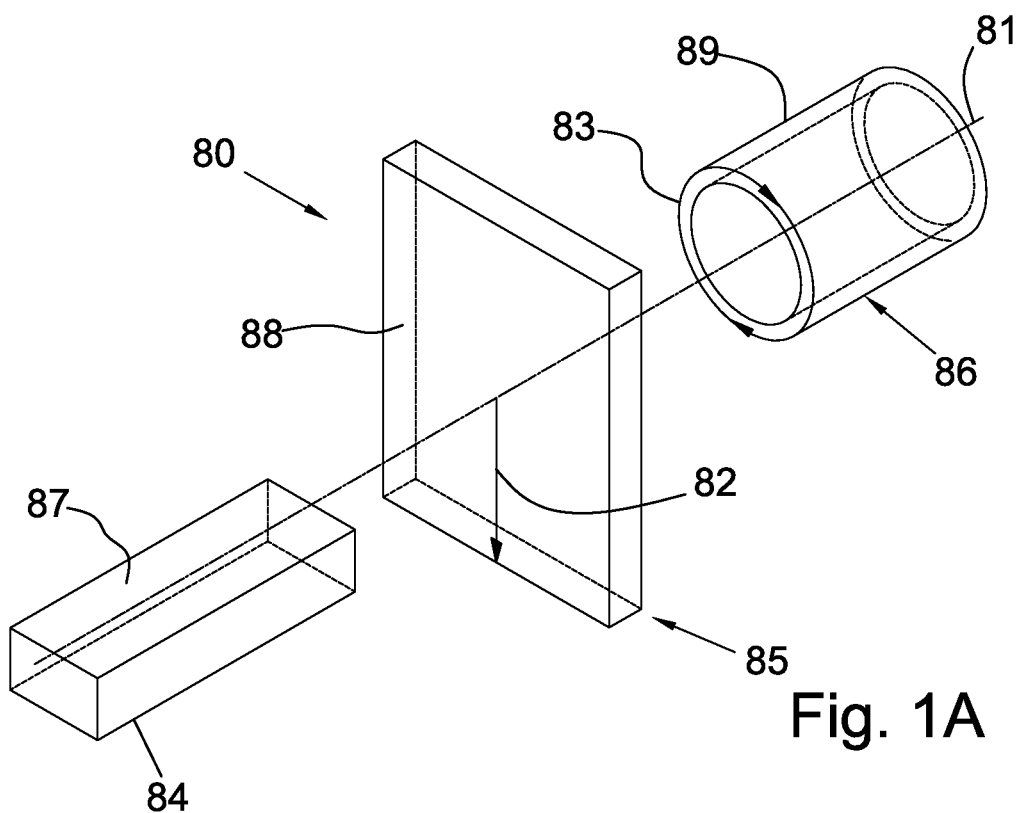
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
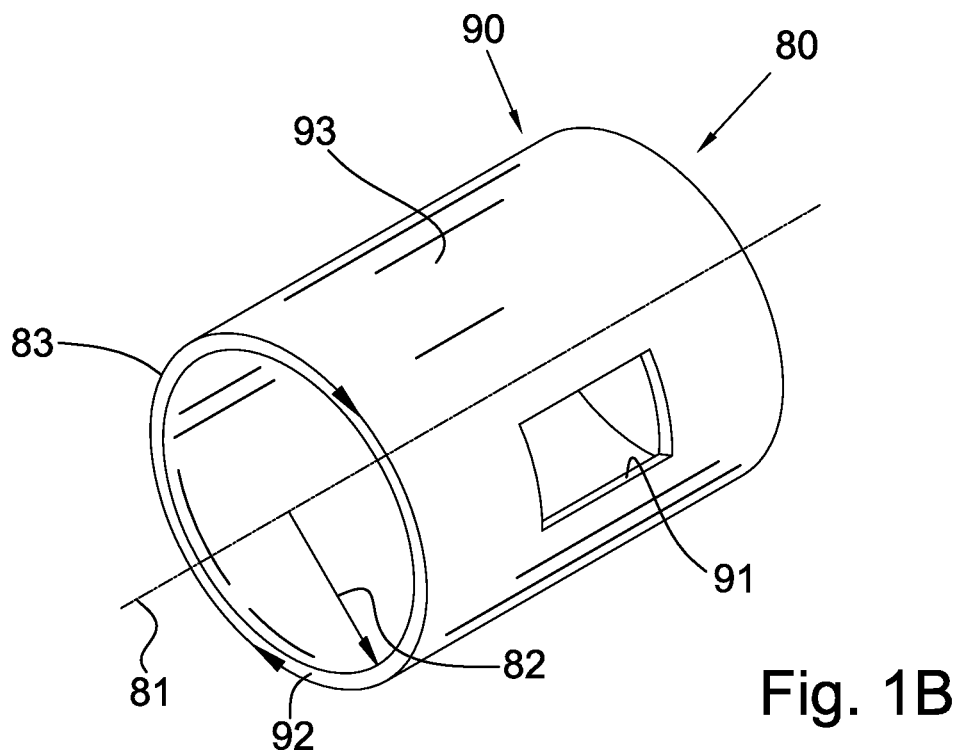
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
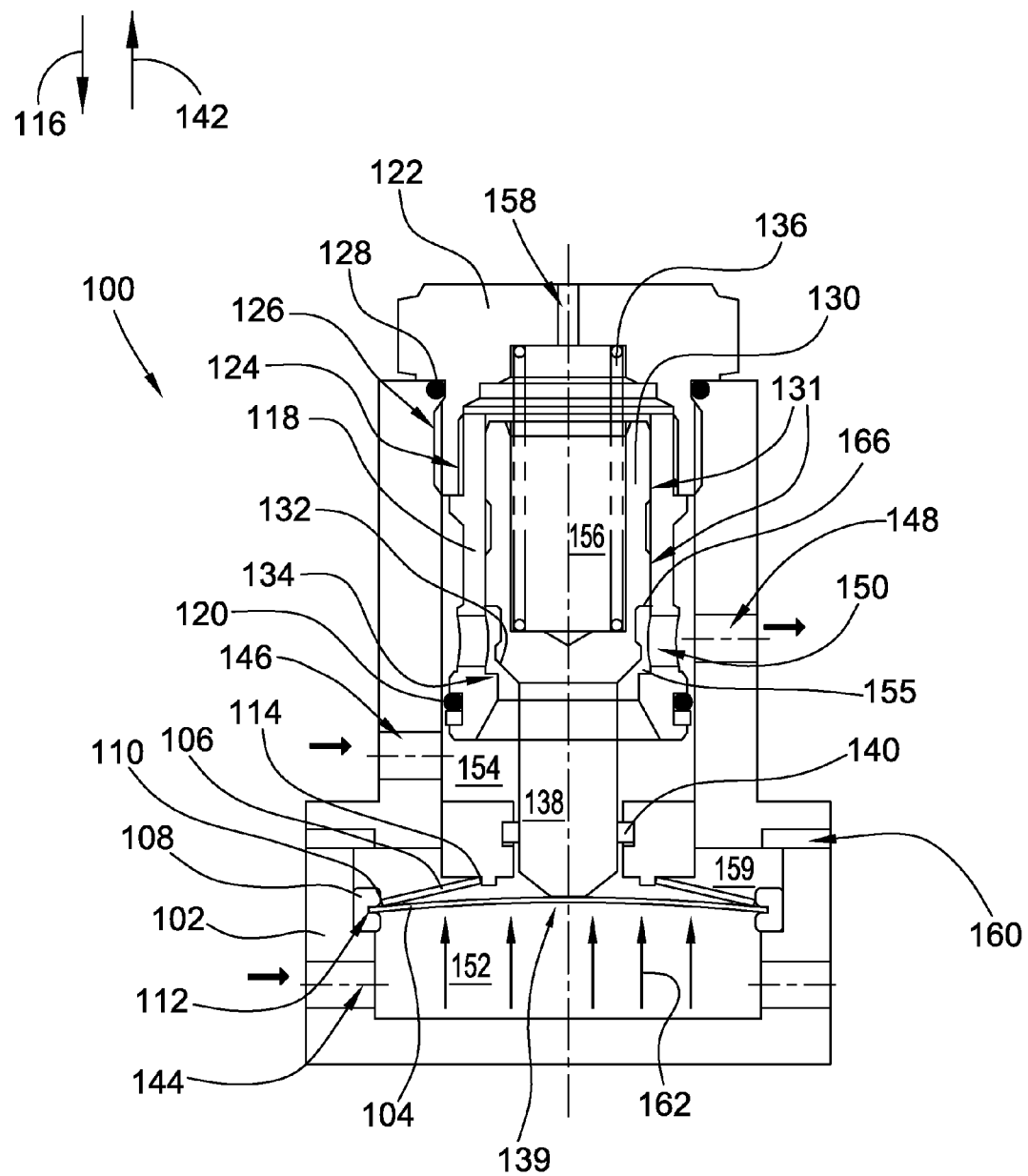
FIG. 2 is a cross sectional view of a hydraulic valve shown in a normal operating mode according to an example aspect.

The following description is made with reference to FIG. 2. FIG. 2 is a cross sectional view of hydraulic valve 100 shown in a normal operating mode according to an example aspect. Valve 100 may be a hydraulic valve for a vehicle transmission. That is, valve 100 may be designed to control flow of hydraulic fluid in a vehicle transmission as described infra. Valve 100 may control flow of hydraulic fluid to a clutch in a planetary automatic transmission, for example.

Valve 100 includes housing 102, snap-spring 104 and overstroke spring 106. By snap-spring, or snap-disk, we mean a bi-stable spring or a spring that can be "snapped through" to change its equilibrium position. By equilibrium position we mean a position where the spring remains until acted on by an outside influence. Snap-spring 104 has at least two equilibrium positions. For example, spring 104 may include concave and convex equilibrium positions. Overstroke spring 106 may be a belleville washer, for example. Snap-spring 104 and overstroke spring 106 are disposed within housing 102.

Snap-spring 104 may be sealed to housing 102 by seal 108. Seal 108 may be a rubber seal or a teflon seal, for example. In some embodiments (not shown), spring 104 is sealed to housing 102 by a tight fit between the spring and housing. Overstroke spring 106 is arranged to act on spring 104. That is, outer diameter 110 of spring 106 abuts spring 104 at outer diameter portion 112. Inner diameter 114 of spring 106 abuts housing 102. Overstroke spring 106 urges outer portion 112 of snap-spring 104 in direction of arrow 116.

Valve 100 may include internal housing 118 disposed within housing 102. In some embodiments (not shown), relevant features of internal housing 118 are integrated into housing 102. Housing 118 is sealed to housing 102 by seal 120. Seal 120 may be an o-ring seal, for example. Internal housing 118 is axially fixed to housing 102 through interaction of cap 122. That is, cap 122 is attached to internal housing 118 at threaded portion 124, and cap 122 is attached to housing 102 at threaded portion 126. Cap 122 is sealed to housing 102 by seal 128.

Sealing piston 130 is sealed to internal housing 118 at areas 131. Areas 131 are depicted as a close fit between housing 118 and piston 130, although other embodiments (not shown) may include a sealing element between piston 130 and housing 118 at areas 131. Piston 130 includes angled face 132 arranged to interface with corner 134 of housing 118. That is, piston 130 and housing 118 can be sealingly engaged by contact between face 132 and corner 134. Valve spring 136 urges piston 130 towards corner 134 of housing 118. Spring 136 is axially retained by cap 122. Shaft 138 is disposed axially between inner portion 139 of spring 104 and piston 130, and sealed to housing 102 by seal 140. Seal 140 may be a low friction seal so that shaft 138 slides easily. Seal 140 may be a teflon seal, for example. In the normal operating mode shown in FIG. 2, force of spring 104 is greater than force of spring 136 so that shaft 138 axially displaces piston 130 in direction of arrow 142 and away from corner 134. That is, snap-spring 104 displaces sealing piston 130 away from sealing engagement with housing 102 when valve 100 is in the open position.

Valve 100 includes pressure ports 144, 146, and 148 disposed in housing 102. Pressure ports 144 and 146 may be connected to a pressure source and port 148 may be connected to a clutch pack. Ports 144 and 146 may be connected to a transmission pump, for example. Internal housing 118 includes port 150 in fluid communication with port 148 of housing 102. In some embodiments where housing 118 is integral to housing 102, ports 148 and 150 may be the same port. Valve 100 further includes chambers 152, 154, and 155 in fluid communication with respective ports 144, 146, and 148. Pressure chamber 152 is at least partially defined by housing 102 and snap-spring 104. Pressure chamber 154 is at least partially defined by housing 102 and sealing piston 130. Chamber 156 is fluidly connected to a sump (not shown) through port 158 in cap 122 to drain fluid leaking past sealed areas 131. Exhaust chamber 159 is connected to a sump (not shown) through port 160.

Operation of valve 100 will now be described. During normal operation as shown in FIG. 2, valve 100 is open. Pressurized hydraulic oil enters valve 100 through ports 144 and 146. Pressure in chamber 152 indicated by arrows 162 acts on snap spring 104. So long as pressure in chamber 152 is below a predetermined limit, spring 104 maintains the position shown in FIG. 2. Pressure in chamber 154 and force of spring 104 acting on shaft 138 displace piston 130 so that ports 146 and 148 are in fluid communication. That is, flow introduced in port 146 flows through chamber 154 and past piston 130 to port 148. Alternatively stated, flow from a transmission pump can proceed from port 146 through valve 100 and out port 148 to a piston plate chamber for a clutch pack.

Figure 3:
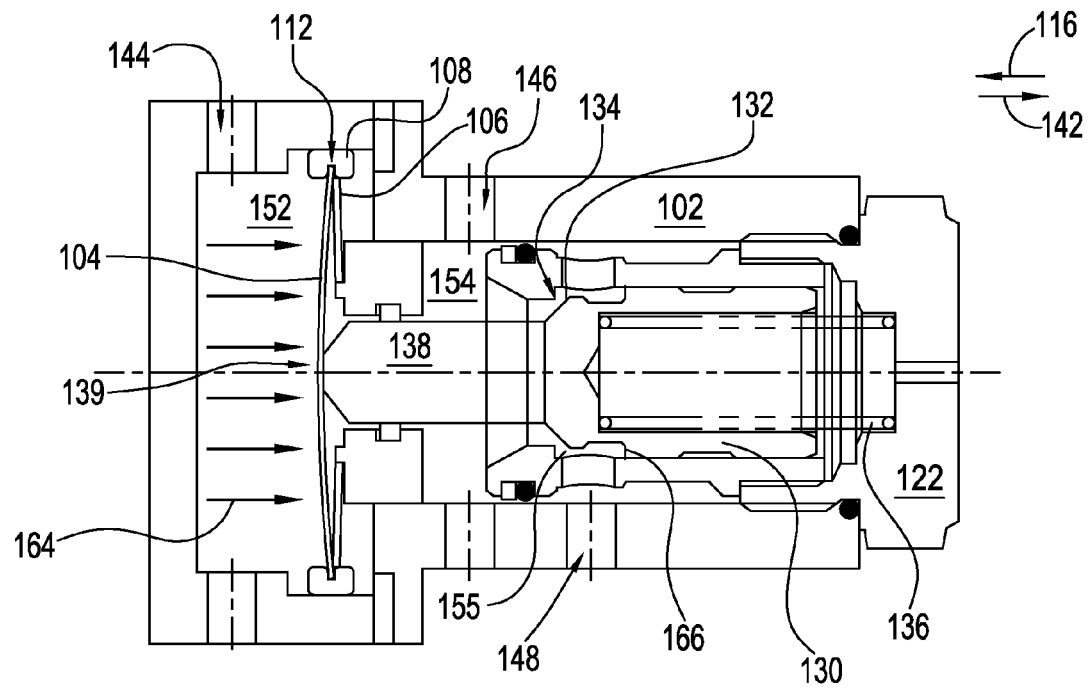
FIG. 3 is a cross-sectional view of the valve of FIG. 2 shown in a transition mode.
Figure 4:
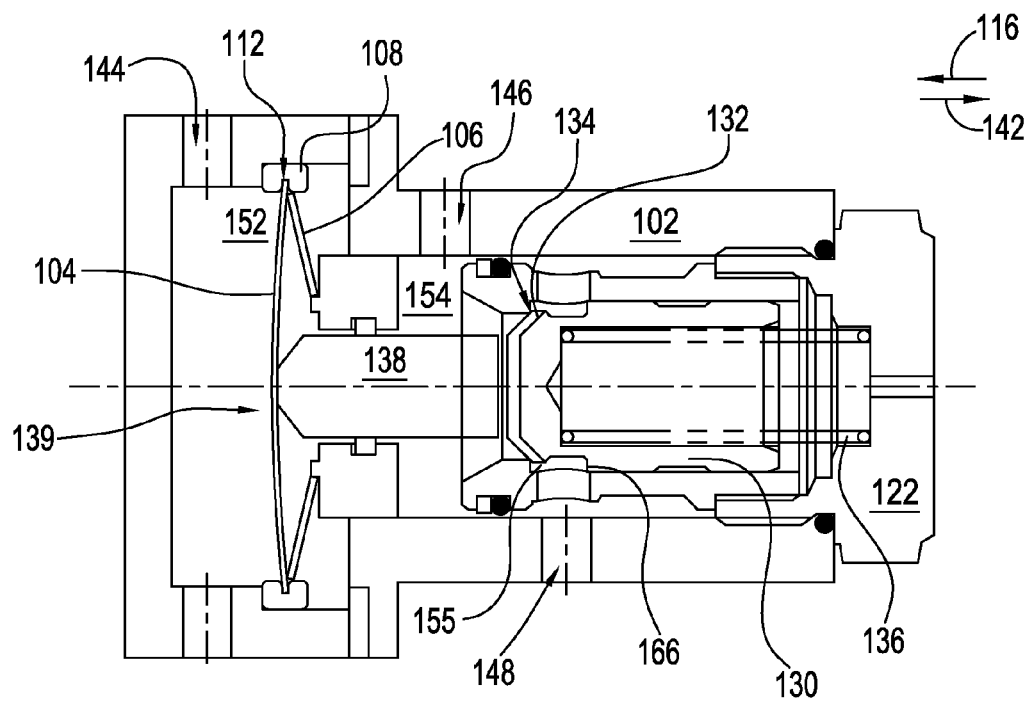
FIG. 4 is a cross-sectional view of the valve of FIG. 2 shown in a closed mode.

The following description is made with reference to FIGS. 2-4. FIG. 3 is a cross-sectional view of valve 100 of FIG. 2 shown in a transition mode. FIG. 4 is a cross-sectional view of valve 100 of FIG. 2 shown in a closed mode. Increased, overstroke pressure in chamber 152 indicated by bold arrows 164 acting on snap spring 104 axially displaces outer portion 112 of spring 104 urging overstroke spring 106 in direction of arrow 142. It should be noted that the increased pressure is greater than a normal operating pressure for the clutch. By normal operating pressure, we mean the pressure required to operate the transmission at the required torque capacity. For example, the clutch requires a defined pressure in the piston plate chamber to clamp the clutch pack and transmit required torque. The pressure to transmit the rated torque is the normal operating pressure. Axial deflection of inner portion 139 of the snap-spring is restricted by contact with shaft 138, piston 130 and cap 122. Once the input pressure exceeds a predetermined value, snap-spring 104 "snaps through" to the position shown in FIG. 3. The predetermined value can be controlled in part by the force of overstroke spring 106.

As can be seen in FIG. 3, outer portion 112 of spring 104 has shifted in direction of arrow 142 displacing seal 108 and outer portion 110, and compressing overstroke spring 106. That is, snap-spring 104 is arranged to displace overstroke spring 106 to move from the first equilibrium position to the second equilibrium position when acted upon by pressurized hydraulic fluid having a pressure greater than a normal operating pressure for the clutch. Otherwise stated, displacement of overstroke spring 106 by spring 104 in response to an increase in hydraulic pressure permits axial motion of outer portion 110 and displacement of spring 104 from the first equilibrium position to the second equilibrium position. Axial force of spring 136 in direction of arrow 116 is less than axial force in direction 142 from pressure in chamber 152. Therefore, flow from port 146 to port 148 is unrestricted because angled face 132 remains displaced from corner 134.

Once pressure is removed from port 144 and chamber 152 (see FIG. 4), axial force of spring 136 urges piston 130 and shaft 138 in direction of arrow 116. Shaft 138 urges inner portion 139 of spring 104 in direction of arrow 116. Likewise, overstroke spring 106 urges outer portion 112 of spring 104 and seal 108 in direction of arrow 116 until seal 108 contacts housing 102. Remaining pressure in chamber 155 acting on area 166 of piston 130 urges piston in direction of arrow 142 until force of valve spring 136 overcomes the pressure force. Therefore, valve spring 136 and area 166 can be adjusted to provide an appropriate pressure force for chamber 155.

Axial motion of spring 104 in direction of arrow 116 allows axial motion of piston 130 in direction of arrow 116 until face 132 contacts corner 134 restricting flow of fluid between ports 146 and 148, closing valve 100. Otherwise stated, input pressure acting on snap-spring 104 displaces overstroke spring 106 and adjusts valve 100 into a closed position when the input pressure is released. That is, valve spring 136 displaces sealing piston 130 into sealing engagement housing 102 when valve 100 is in the closed position.

Therefore, pressure is maintained in chamber 155, port 148 and the piston plate chamber for the connected clutch pack, for example, even when the pressure source (not shown) is not providing pressure. A pre-pressurized, or pre-charged, clutch pack, described above, reacts faster during a launch event when the vehicle engine has been turned off. This functionality is important in start-stop vehicle strategies for improved fuel economy.

Valve 100 can be easily reset by the next normal pressure event. For example, after the stop event, pressure enters valve 100 through ports 144 and 146 axially displacing inner portion 139 of spring 104. It should be noted that the pressure is less than the overstroke pressure required to close the valve and less than or equal to the normal pressure. Spring 104 displaces shaft 138 and piston 130, restoring fluid communication between ports 146 and 148 to engage and disengage the clutch pack. Axial displacement of outer portion 112 of spring 104 is restricted by contract with outer diameter 110 of overstroke spring 106, so spring 104 "snaps through" to the position shown in FIG. 2. Valve 100 remains in this condition with fluid communication between ports 146 and 148 until the next high pressure, overstroke event.

Figure 5:
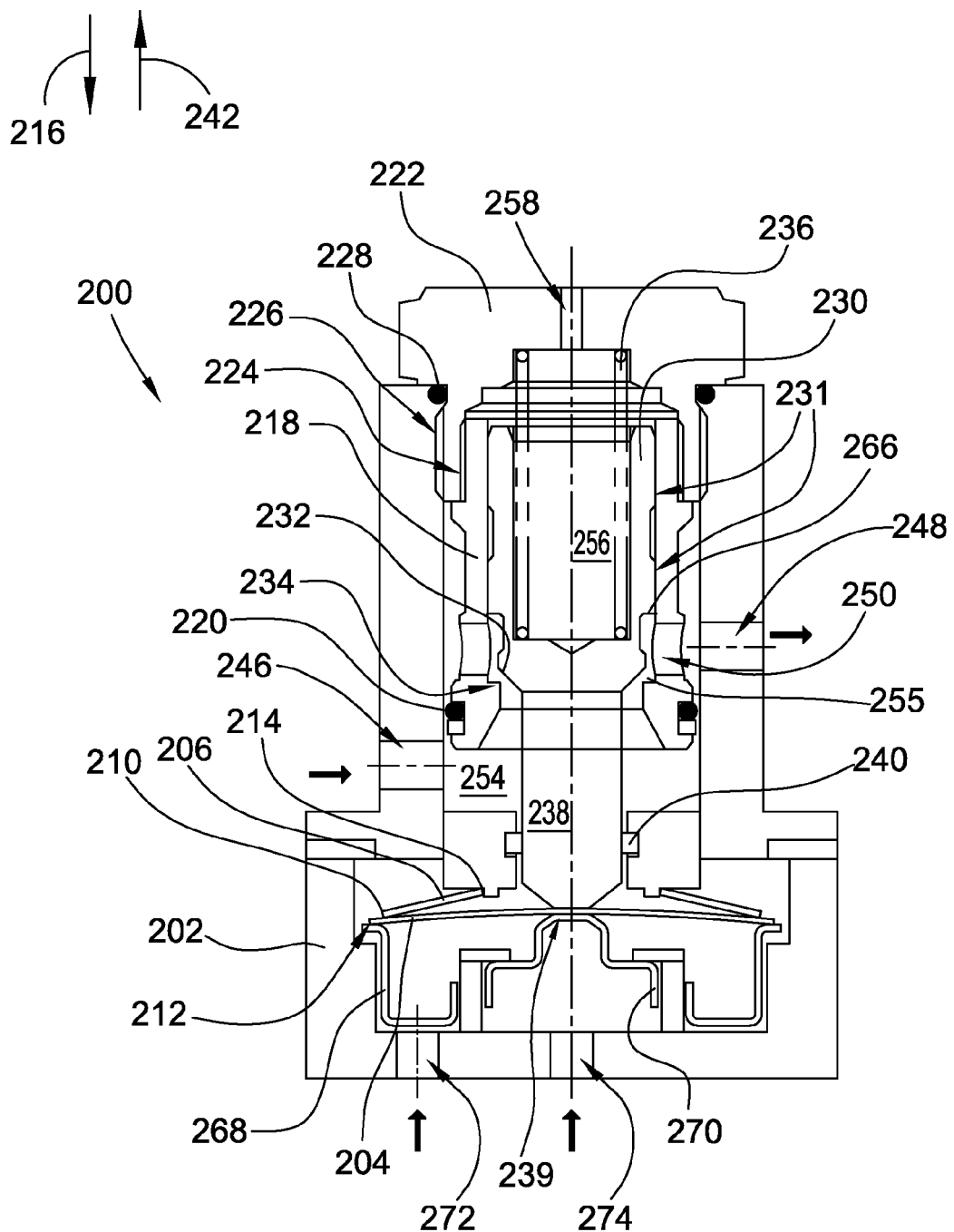
FIG. 5 is a cross-sectional view of a valve assembly according to an example aspect.

The following description is made with reference to FIG. 5. FIG. 5 is a cross-sectional view of valve assembly 200 according to an example embodiment. In general, the above description and operation of valve assembly 100 applies to valve assembly 200. Most 2XX references correspond with 1XX references described supra. For the sake of brevity, only the differences between valves 100 and 200 are now described.

Valve 200 includes close piston 268 and open piston 270, in fluid communication with respective ports 272 and 274. Ports 272 and 274 are connected to a pressure source. Spring 204 is not sealed to housing 202. Normal operation of valve 200 is similar to valve 100. Force of spring 236 is overcome by forces of spring 204 and pressure acting on open piston 270, axially displacing sealing piston 230 away from housing 218 and opening valve 200.

When pressure in ports 272 and 274 is increased beyond the normal operating pressure to an overstroke pressure, overstroke piston 268 axially displaces outer portion 212 of snap-spring 204, compressing overstroke spring 206. Axial deflection of inner portion 239 is restricted by contact with shaft 238, piston 230 and cap 222. Once the input pressure exceeds a predetermined value, snap-spring 204 "snaps through" as described supra. After pressure is removed from ports 246, 268, and 274, valve 200 closes, preventing leakage of fluid in port 248 and the clutch pack (not shown).

As described for valve 100, valve 200 can be easily reset by the next pressure event. For example, after the stop event, pressure enters valve 100 through ports 246, 272, and 274 axially displacing open piston 270 and inner portion 239 of spring 204. It should be noted that the pressure is less than the overstroke pressure required to close the valve and less than or equal to the normal operating pressure. Spring 204 displaces shaft 238 and piston 230, restoring fluid communication between ports 246 and 248 to engage and disengage the clutch pack. Axial displacement of outer portion 212 of spring 204 is restricted by contract with outer diameter 210 of overstroke spring 206, so spring 204 "snaps through" as described supra. Valve 200 remains in this condition with fluid communication between ports 246 and 248 until the next high pressure event.

The following description is made with reference to FIG. 6. FIG. 6 is a cross sectional view of hydraulic valve 300 shown in an open mode according to an example aspect. Valve 300 is shown disposed within transmission 400. That is, valve 300 may be designed to control flow of hydraulic fluid in vehicle transmission 400 as described infra. In the example embodiment shown, for example, valve 300 controls a flow of hydraulic fluid to clutch 402 in planetary automatic transmission 400.

Valve 300 includes housing 302, snap-spring 304 and overstroke spring 306. By snap-spring, or snap-disk, we mean a bi-stable spring or a spring that can be "snapped through" to change its equilibrium position. Spring 304 operates in convex and concave positions as described infra. Overstroke spring 306 may be a belleville washer, for example. Overstroke spring 306 is preloaded between housing 302 and snap ring 307, as indicated by phantom line 306A. That is, spring 306 is compressed against piston 302 when snap ring 307 is installed. In the embodiment shown in FIG. 6, housing 302 comprises a clutch piston. That is, a portion of housing 302 is also a piston for transmission clutch 402.

Overstroke spring 306 is arranged to act on spring 304. That is, inner diameter 310 of spring 306 is engaged with spring 304 at outer diameter portion 312. Outer diameter 314 of spring 306 is engaged with snap ring 307 disposed in housing 302, as described supra. Outer diameter portion 312 is retained between spring 306 and pivot plate 315. Overstroke spring 306 urges outer portion 312 of snap-spring 304 in direction of arrow 316. Overstroke piston 317 is arranged to displace plate 315 and outer diameter portion 312 of spring 304, as described infra. Piston 317 is sealed to housing 302 by seals 319 and 321.

Valve 300 may include internal housing 318. In some embodiments (not shown), relevant features of internal housing 318 are integrated into housing 302. Housing 318 is sealed to housing 302 by seal 320. Seal 320 may be an o-ring seal or a teflon seal, for example. Internal housing 318 is axially fixed to the transmission housing 404. Housing 404 is sealed to housing 302 by seal 328.

Sealing piston, or poppet, 330 is sealed to internal housing 318 at areas 331. Areas 331 are depicted as a close fit between housing 318 and piston 330, although other embodiments (not shown) may include a sealing element between piston 330 and housing 318 at areas 331. Piston 330 includes angled face 332 arranged to interface with corner 334 of housing 318. That is, piston 330 and housing 318 can be sealingly engaged by contact between face 332 and corner 334. Valve spring 336 urges piston 330 towards corner 334 of housing 318. Spring 336 is axially retained by valve piston 338. Piston 338 axially retains inner portion 339 of spring 304.

Valve 300 further includes valve release spring 340 axially disposed between housing 404 and poppet 330. Snap-spring 304 controls an axial position of valve piston 338 and compression of spring 336. In the normal operating mode shown in FIG. 6, force of spring 340 is greater than force of spring 336 so that piston 330 is displaced in direction of arrow 342 and away from corner 334. That is, snap-spring 304 displaces valve piston 338 allowing displacement of piston 330 away from sealing engagement with housing 318 when valve 300 is in the open position.

Transmission 400 includes clutch 402, housing 404, and sealing plate 406. Plate 406 is fixed to housing 318 and sealed to housing 302 with seal 408. Transmission 400 also includes shaft 410 sealed to housing 318 with seals 412 and 414. Transmission clutch release spring 416 is axially disposed between plate 406 and housing 302. Spring 416 aids in releasing clutch pack 402. In some embodiments (not shown), overstroke spring 306 is not present in valve assembly 300 and release spring 416 performs the function of overstroke spring 306. That is, spring 416 contacts outer portion 312 of spring 304, urging spring 304 in direction of arrow 316. In the embodiments where overstroke spring 306 is not present, release spring 416 is the overstroke spring.

The following description is made with reference to FIG. 6A. FIG. 6A is a detail view of a portion of valve 300 circumferentially offset from the portion of valve 300 depicted in FIG. 6, shown in an open mode. Valve 300 includes open piston 330A and springs 336A and 340A disposed in a portion of housing 318 circumferentially offset from piston 330.

Valve 300 includes pressure ports 344, 346, and 348 disposed in housing 318, and overstroke port 349 disposed in housing 302. Pressure ports 344 and 346 may be connected to a pressure source. Ports 344 and 346 may be connected to a transmission pump, for example. Valve 300 further includes chambers 352, 354, and 355 in fluid communication with respective ports 346, 348, and 349. Pressure chamber 352 is at least partially defined by housing 318 and piston 330A. Pressure chamber 354 is at least partially defined by housing 318 and sealing piston 330. Pressure chamber 355 is at least partially defined by housing 302 and piston 317. Chamber 356 is fluidly connected to a sump (not shown) through port 358 in housing 318 to drain fluid leaking past sealed areas 331.

Operation of valve 300 will now be described. The following description is made with reference to FIGS. 7 and 7A. FIG. 7 is a cross-sectional view of valve 300 of FIG. 6 shown in a clutch apply mode. FIG. 7A is a detail view of a portion of valve 300 circumferentially offset from the portion of valve 300 depicted in FIG. 7, shown in a clutch apply mode. During normal operation as shown in FIGS. 6 and 6A, valve 300 is open. Pressurized hydraulic oil enters valve 300 through ports 344 and 346. Pressure in chamber 354 enters chamber 355 through port 349. Pressure in chamber 355 operates on overstroke piston 317 and snap spring 304. So long as pressure in chamber 354 is below a predetermined limit, spring 304 maintains the position shown in FIG. 7. Force of pressure in chambers 352 and 354 acting on respective pistons 330A and 330 urges valve piston 338 in direction of arrow 342. Pressure in chamber 354 and force of spring 340 displace piston 330 so that ports 344 and 348 are in fluid communication. That is, flow introduced in port 344 flows past piston 330 to port 348 and chamber 354. Alternatively stated, flow from a transmission pump can proceed from port 344 through valve 300 and out port 348 to pressurize piston 302, urging piston 302 in direction of arrow 342 engaging clutch pack 402.

The following description is made with reference to FIGS. 8 and 8A. FIG. 8 is a cross-sectional view of valve 300 of FIG. 6 shown in a transition mode. FIG. 8A is a detail view of a portion of valve 300 circumferentially offset from the portion of valve 300 depicted in FIG. 8, shown in a transition mode. Increased, overstroke pressure in chamber 355 acting on snap spring 304 through pivot plate 315 and overstroke piston 317 axially displaces outer portion 312 of spring 304 urging overstroke spring 306 in direction of arrow 342. It should be noted that the increased pressure is greater than a normal operating pressure for clutch 402. Axial deflection of inner portion 339 is restricted by contact with valve piston 338 and sealing plate 406. Once the input pressure exceeds a predetermined value, snap-spring 304 "snaps through" to the position shown in FIG. 8. The predetermined value can be controlled in part by the force of overstroke spring 306.

As can be seen in FIG. 8, outer portion 312 of spring 304 has shifted in direction of arrow 342 displacing outer portion 310, and compressing overstroke spring 306.

Axial force of pressure in chamber 354 acting on sealing piston 330 in direction of arrow 342 is greater than axial force of spring 336 acting in direction 316. Therefore, flow from port 344 to port 348 is unrestricted because angled face 132 remains displaced from corner 134. Similarly, pressure force acting on piston 330A in direction of arrow 342 is greater than force of spring 336A acting in direction 316.

The following description is made with reference to FIGS. 9 and 9A. FIG. 9 is a cross-sectional view of valve 300 of FIG. 6 shown in an idle-stop mode. FIG. 9A is a detail view of a portion of valve 300 circumferentially offset from the portion of valve 300 depicted in FIG. 9, shown in an idle-stop mode. Once pressure is removed from port 344 and chamber 355, overstroke spring 306 urges snap-spring 304, pivot plate 315, and overstroke piston 317 in direction of arrow 316. Snap-spring 304 pulls valve piston 338 in direction 316. Axial force of overstroke spring 306 is greater than force of spring 340. Valve piston 338 urges sealing piston 330 in direction of arrow 316. Remaining pressure in chambers 354 and 355 acting on area 366 of piston 130 urges piston in direction of arrow 342 until force of spring 336 overcomes the pressure force. Therefore, springs 336 and 340, and area 366 can be adjusted to provide an appropriate pressure force for chamber 354.

Axial motion of spring 304 in direction of arrow 316 allows axial motion of piston 330 in direction of arrow 316 until face 332 contacts corner 334 restricting flow of fluid between ports 344 and 148, closing valve 300. Otherwise stated, input pressure acting on snap-spring 304 displaces overstroke spring 306 and adjusts valve 300 into a closed position when the input pressure is released. That is, valve spring 336 displaces sealing piston 330 into sealing engagement with housing 318 when valve 300 is in the closed position. Similarly, force of spring 336A acting on piston 330A.

Therefore, pressure is maintained in chamber 354 and port 348 even when the pressure source (not shown) is not providing pressure. Force of clutch release spring 416 can be adjusted to control position of piston 302 relative to clutch pack 402. For example, piston 302 can keep clutch pack 402 engaged; piston 302 can be contacting clutch pack 402 without engaging the clutch; or piston 302 can be axially offset from clutch pack 402 by a small distance as shown in FIG. 9. Maintaining distance between piston 302 and clutch pack 402 assures clutch pack 402 is disengaged, but the maintained pressure in chamber 354 advantageously decreases the clutch apply time.

The following description is made with reference to FIGS. 10 and 10A. FIG. 10 is a cross-sectional view of valve 300 of FIG. 6 shown in a re-open mode. FIG. 10A is a detail view of a portion of valve 300 circumferentially offset from the portion of valve 300 depicted in FIG. 10, shown in a re-open mode. Valve 300 can be easily reset by the next normal pressure event. For example, after the stop event, pressure enters valve 300 through ports 344 and 346 axially displacing piston 330A in direction of arrow 342. It should be noted that the pressure is less than the overstroke pressure required to close the valve. Piston 330A displaces valve piston 338 in direction of arrow 342, allowing spring 340 to displace piston 330, restoring fluid communication between ports 344 and 348 to engage and disengage the clutch pack. Axial displacement of outer portion 312 of spring 304 is restricted by contract with inner diameter 310 of overstroke spring 306, so spring 304 "snaps through" to the position shown in FIG. 10. Valve 300 remains in this condition with fluid communication between ports 344 and 348 until the next high pressure event.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:
1. A clutch for a vehicle transmission, comprising:
   at least one clutch plate;
   a piston plate displaceable for engaging and disengaging the at least one clutch plate to form a torque path through the at least one clutch plate;
   a chamber, partially formed by the piston plate for receiving and discharging fluid to displace the piston plate;
   a snap-spring displaceable between first and second equilibrium positions;
   a hydraulic valve, including:
      a housing with a first port for connection to a source of pressurized hydraulic fluid and a second port in fluid communication with the chamber;
      a displaceable valve piston; and, a valve spring; wherein:
- in the first equilibrium position the snap-spring holds the valve piston in an open position to enable fluid flow from the source of pressurized hydraulic fluid to the chamber via the first and second ports; and,
- in the second equilibrium position the snap-spring holds the valve piston in a closed position compressing the valve spring;

an overstroke spring, wherein moving from the first equilibrium position to the second equilibrium position comprises displacing the overstroke spring; and an overstroke piston, wherein the overstroke piston displaces the overstroke spring in response to hydraulic fluid pressure greater than a normal operating pressure for the clutch.

2. The clutch of claim 1 wherein the overstroke spring is a clutch release spring.

3. The clutch of claim 1 further comprising a displaceable sealing piston, wherein, during an engine idle mode, hydraulic pressure is withdrawn from the first port and the valve spring displaces the sealing piston to block the second port and trap hydraulic fluid in the chamber.

4. The clutch of claim 3 further comprising a valve release spring, wherein the valve release spring displaces the sealing piston when the snap-spring is in the first equilibrium position.

5. The clutch of claim 4 wherein the valve spring generates an apply force, the valve release spring generates a release force, and the apply force is greater than the release force when the valve spring is compressed by the valve piston.

6. The clutch of claim 1 wherein:
- the clutch includes a chamber for receiving and discharging fluid to displace the piston plate; and,
- the overstroke piston displaces the overstroke spring in response to hydraulic pressure in the chamber greater than a normal operating pressure for the chamber.

7. The clutch of claim 1 further comprising an open piston, wherein moving from the second equilibrium position to the first equilibrium position comprises displacing the open piston.

8. The clutch of claim 7 wherein the pressurized hydraulic fluid displaces the open piston, and wherein a pressure of the pressurized hydraulic fluid for displacing the open piston is less than or equal to a normal operating pressure for the clutch.

* * * * *